UNITED STATES PATENT OFFICE.

JASON L. MERRILL, OF WASHINGTON, DISTRICT OF COLUMBIA.

PROCESS OF MAKING PAPER-PULP FROM FLAX-STRAW, FLAX-TOW, AND OTHER LIGNEOUS MATERIAL.

1,145,498. Specification of Letters Patent. Patented July 6, 1915.

No Drawing. Application filed March 3, 1915. Serial No. 11,922.

(DEDICATED TO THE PUBLIC.)

*To all whom it may concern:*

Be it known that I, JASON L. MERRILL, a citizen of the United States, and an employee of the Department of Agriculture of the said United States, residing in the city of Washington, District of Columbia, (whose post-office address is Washington, District of Columbia,) have invented a new and useful Process for Making Paper-Pulp from Flax-Straw, Flax-Tow, and other Ligneous materials.

This application is made under the act of March 3, 1883, chapter 143 (22 Stat., 625), and the invention herein described and claimed may be used by the Government of the United States or any of its officers or employees in the prosecution of work for the United States or by any person in the United States without the payment of any royalty thereon.

My invention consists in a process for preparing paper pulp from flax straw, flax tow, and other materials of a ligneous nature. From experiments I find that, in order to reduce flax straw, flax tow, and other ligneous materials to a pulpy state adapted for use in the manufacture of wrapping and writing paper, it is essential to subject the raw material to energetic treatment. To obtain pulp from the raw materials specified which is suitable for paper making, it is necessary chemically to reduce the woody constituents present in the product to a degree of fineness which will permit them to be easily separated from the flax fiber. Without removing the woody constituents, pulp obtained from ligneous material is not fit for use in paper making. In practising my invention I employ the well known milk of lime process for making paper pulp from cereal straws. The steps taken in treating flax straw and other ligneous materials are not essentially different from the steps taken in the milk of lime process for treating cereal straws, except I increase materially the amount of lime and the steam pressure ordinarily employed for the reduction of cereal straws.

My invention consists in the quantity of lime used and the steam pressure employed for reducing flax straw, flax tow, and ligneous materials to a pulpy consistency.

As stated, unless the woody elements in flax straw are removed, the flax fiber is not suitable for use in the manufacture of paper. In reducing cereal straws by the milk of lime process, it is usual to treat the product with burned lime in amount varying from ten to twelve per cent. of the quantity of material treated, and to subject the material to steam pressure varying in degree from thirty to forty-five pounds per square inch. Such treatment is sufficient to reduce materials which are not of a highly ligneous nature, but, inasmuch as flax straw and flax tow are highly ligified, they cannot be sufficiently reduced when subjected to the action of lime and steam pressure in an amount which is adequate for effecting the reduction of cereal straws. Because of the chemical nature of lignified material, it requires a more severe treatment. I have discovered that by treating flax straw, flax tow, and other ligneous materials with milk of lime in amount ranging from fifteen to twenty-five per cent. of the material treated, and then subjecting the material to a steam pressure ranging from seventy-five to one hundred pounds per square inch, the ligneous material will yield a suitable fiber from which the woody elements present therein may be removed. After subjecting the flax straw, flax tow, and other ligneous material to the treatment last specified, the product is in condition for breaking and washing. The operation of breaking the material is effected by placing the treated product in an ordinary beating engine and then subjecting the mass to the action of blunt knives set in the periphery of a large rotary roll, which constitutes part of the mechanism of an ordinary beating engine. This operation reduces the woody elements in the product to such a degree of fineness as to make it practicable to separate the woody elements from the flax fiber. The separation of the woody constituents is accomplished by washing the resultant mass on rotary screens, such as are ordinarily used with beating engines. The washing of the treated material completely removes the woody elements and leaves a pulp which is of value and suitable for use in the manufacture of paper.

Having thus described my invention, I claim:

A process for obtaining pulp from ligneous material suitable for paper making, consisting in treating said material with milk of lime in amount ranging from fifteen to twenty-five per cent. of the quantity of material treated, subjecting said treated material to a steam pressure ranging from seventy-five to one hundred pounds per square inch, then cutting the treated material into finely divided parts, and washing the resultant mass for effecting the removal of the woody elements present therein, substantially as specified.

In testimony whereof I affix my signature in the presence of two subscribed witnesses.

JASON L. MERRILL.

Witnesses:
 CHARLES W. BOYLE,
 EDWIN S. FRENCH.